United States Patent [19]

Diamantoglou et al.

[11] Patent Number: 4,795,762
[45] Date of Patent: Jan. 3, 1989

[54] WATER-SWELLABLE COMPOSITION, SYNTHESIS AND USE THEREOF

[75] Inventors: Michael Diamantoglou; Christoph Josefiak, both of Erlenbach; Helmut Magerlein, Obernburg, all of Fed. Rep. of Germany

[73] Assignee: Akzo NV, Netherlands

[21] Appl. No.: 38,977

[22] Filed: Apr. 16, 1987

[30] Foreign Application Priority Data

Apr. 18, 1986 [DE] Fed. Rep. of Germany ....... 3613207

[51] Int. Cl.$^4$ .......................... C08K 3/22; C08L 33/00; B01J 19/06; C08J 3/06
[52] U.S. Cl. .................................. 521/84.1; 521/147; 521/149; 523/218; 524/430; 524/450; 524/555; 524/556; 524/562; 524/847
[58] Field of Search ....................... 521/84.1, 147, 149; 523/218; 524/430, 450, 847, 555, 556, 562

[56] References Cited

U.S. PATENT DOCUMENTS

| | | | |
|---|---|---|---|
| 3,354,084 | 11/1967 | Katzer | 252/2 |
| 3,932,322 | 1/1976 | Duchane | 260/17.4 |
| 4,107,121 | 8/1978 | Stoy | 524/566 |
| 4,134,863 | 1/1979 | Fanta et al. | 260/17.4 |
| 4,179,367 | 12/1979 | Barthell et al. | 210/41 |
| 4,337,328 | 6/1982 | Holst et al. | 525/336 |
| 4,464,486 | 8/1984 | Kramer et al. | 521/83 |
| 4,587,308 | 5/1986 | Makita et al. | 524/430 |

FOREIGN PATENT DOCUMENTS

| | | |
|---|---|---|
| 2028956 | 12/1970 | Fed. Rep. of Germany . |
| 2753214 | 6/1978 | Fed. Rep. of Germany . |
| 2706135 | 8/1978 | Fed. Rep. of Germany . |
| 2903267 | 8/1980 | Fed. Rep. of Germany . |
| 3326930 | 2/1984 | Fed. Rep. of Germany . |
| 3503458 | 8/1985 | Fed. Rep. of Germany . |
| 772734 | 4/1957 | United Kingdom . |
| 848368 | 9/1960 | United Kingdom . |

OTHER PUBLICATIONS

Chemisches Zentralblatt, 1966, H.31, Ref. 1003.
Chemisches Zentralblatt, 1965, H.12, Ref. 1075.
Hochmolekularbericht, 1963, Ref. H.726/63.

Primary Examiner—Herbert J. Lilling
Attorney, Agent, or Firm—Parkhurst, Oliff & Berridge

[57] ABSTRACT

A new water-swellable composition of a gelling agent based on hydrolyzed homo- or copolymers of acrylonitrile and of an inert metal oxide was synthesized. In the process, 1 to 22% of the nitrile groups were saponified to amide groups and 99 to 78% to alkali-metal salts. The obtained composition had a spongy structure and was characterized by high values with regard to both swelling capacity and swelling rate. Therefore it is particularly suitable for diaper manufacture and for agricultural use.

26 Claims, 4 Drawing Sheets

– –

WATER-SWELLABLE COMPOSITION, SYNTHESIS AND USE THEREOF

TECHNICAL FIELD

The invention relates to a water-swellable composition of a gelling agent based on hydrolyzed homo- or copolymers of acrylonitrile and of an inert metal oxide. It also relates to a process for synthesis thereof as well as use thereof.

BACKGROUND

The synthesis of such a composition is described in West German Laid-Open Application No. 3,503,458. Therein a water absorbing resin in the presence of a powder of an inert inorganic material is allowed to absorb a cross-linking agent and water. This mixture is then heated while stirring, in order to bring about cross-linking of the resin and removal of water. The resin contains units of a monomer with a carboxyl group in the form of the free acid or of a salt as a structural component thereof. The water-absorbing resin can be preferably, for example, a cross-linked terpolymer of acrylic acid, acrylamide and sulfonated acrylamide as well as the alkali-metal salt thereof. The inorganic material can preferably be finely divided silicon dioxide. The so-synthesized products are supposed to have both good water-absorbing capacity and a high water-absorption rate. This combination of properties is important in particular for use in the hygiene area as well as in the area of agriculture.

SUMMARY OF THE INVENTION

The object of the present invention is to make available compositions which in water, aqueous salt solutions and physiological fluids swell at a very high rate and at the same time to a very large extent. The object of the invention is also to synthesize this composition simply, reliably and inexpensively.

BRIEF DESCRIPTION OF THE FIGURES

FIG. 4 depicts enlarged photographs of compositions according to the invention wherein

DETAILED DESCRIPTION OF THE INVENTION

Figure 1:
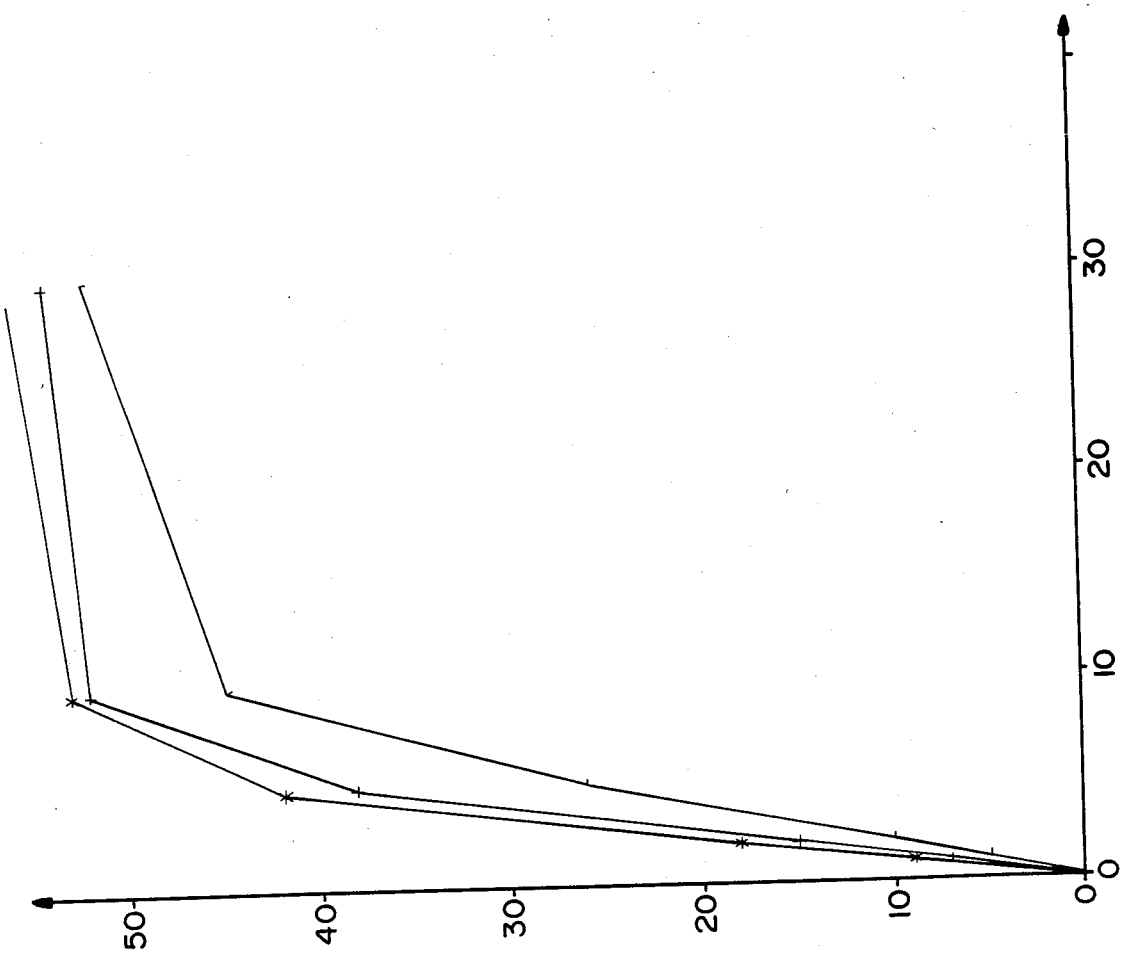
FIG. 1 is a graph depicting swelling rates of compositions according to the invention wherein the absorbed quantity in milliliters of a 1% sodium chloride solution at a pressure of 1.6 mbar is plotted over time as measured in minutes and wherein data points for the compositions of Examples 21, 22 and 48 are illustrated by —, +, and * respectively.

The achievement of the above and other objects according to the present invention is to be seen in the claims. It is primarily characterized by the choice of a favorable ratio of amide groups to alkali-metal carboxylate groups. It is obtained by partial saponification and neutralization of the nitrile, ester or carboxylic acid groups of homo- or copolymers of acrylonitrile with unsaturated compounds such as acrylic acid, acrylic acid esters, methacrylic acid, methacrylic acid esters, maleic acid, maleic anhydride, acrylamide or vinylsulfonic acid.

For saponification, alkali-metal hydroxides, especially sodium and potassium hydroxide, are used in a proportion of 0.5 to 1.5, preferably 1.0 to 1.25 mole per mole of component to be saponified.

The compositions of the invention are pulverulent and have a porous structure in the manner of a sponge. The pore diameters lie mainly in the range of 0.5 to 10 microns.

Essential also is the presence of an inert metal oxide such as $Al_2O_3$ and especially $SiO_2$. They are preferably added as early as during the polymerization, but can also be added during saponification. Also defined as metal oxide are the corresponding aqueous oxides. The metal oxides are regarded as inert if they either do not react at all during polymerization or if the bonds then formed are cleaved again in the subsequent treatment with lyes.

The gelling agent is synthesized by polymerization of acrylonitrile and possibly comonomers in water, and by subsequent partial saponification of the polymer. Coming into consideration as comonomers are other unsaturated compounds, especially acrylic acid, acrylic acid esters, methacrylic acid, methacrylic acid esters, maleic acid, maleic anhydride, acrylamide, vinyl acetate, styrene and vinylsulfonic acid. However, even saturated, hydroxy-group-containing polymers, especially polysaccharides, polysaccharide derivatives and polyvinyl alcohol, can be used for formation of graft polymers. Depending on the monomers used, the synthesis is conducted in one or two stages. The two-stage process (Examples 1–36) is used if, during polymerization, a product is formed which swells not at all or only slightly in the aqueous reaction medium. This is the case, for example, if only acrylonitrile or acrylonitrile in combination with vinyl acetate, styrene or acrylic acid or methacrylic acid esters, is polymerized. In this case, the metal oxide (silicic acid, silica gel, Aerosil®, alumina) is added prior to the polymerization. In this case it is particularly important that the metal oxide reacts with the monomers to be polymerized either not at all or to form only a very unstable compound, which is decomposed again at the latest during the saponification. The polymer synthesized in this way is sucked off and then, in a water/alcohol mixture, using the desired alkali-metal hydroxide, is saponified wet or after prior drying. Standard stirring reactors are very suitable for the polymerization and saponification.

Vinyl acetate, styrene and the metal oxide can, because of the hydrophobic character thereof, be admixed only in limited proportions. In Examples 2 to 9 and 11 to 14, the relationship between degree of swelling and filler proportion is demonstrated.

The water content of the saponification medium must not significantly exceed 30 volume percent, since otherwise a gummy mass and not a granular product is formed during the saponification.

The nitrile groups must be saponified to a specified extent only to acyl amide groups and not completely to carboxylate groups, since acyl amide groups influence the swelling behavior of the hydrogel in aqueous salt solutions particularly favorably. This is clearly apparent from Examples 16 to 20 and 28.

Gelling agents which were synthesized by this procedure without addition of metal oxide (Comparison Examples 30 and 31) swell very slowly in water and aqueous salt solutions. The swelling rate is greatly improved, however, if the metal oxide is admixed with the saponification charge (Examples 32 to 36).

The reaction mixture/conditions during the polymerization are preferably:
acrylonitrile content: 50 to 99, preferably 85 to 98 weight percent
comonomer content: 0 to 30, preferably 5 to 15 weight percent
metal oxide: 1 to 50, preferably 2 to 10 weight percent
reaction medium: water
reaction temperature: 30° to 80° C., preferably 40° to 60° C.
initiator: standard, e.g., persulfates, peroxides, ammonium cerium nitrate The reaction mixture/conditions during the saponification are preferably:
alkali-metal hydroxide: sodium hydroxide, potassium hydroxide
alkali proportion: 0.5 to 1.5, preferably 1 to 1.25 mole per mole of component to be saponified
reaction medium: water/alcohol with 1 to 4 C atoms (alcohol: preferaby methanol or ethanol)
water content: 5 to 40 volume percent, preferably 10 to 30 volume percent
reaction temperature: reflux temperature
N content after saponification: 0.1 to 16%, preferably 0.5 to 7%, corresponding respectively to an acyl amide-group content of 0.3 to 50% or 1.5 to 22%

The one-stage process (Examples 37 to 59) is used if, during the polymerization, a product is formed which swells very strongly in the aqueous reaction medium. This is the case, for example, if acrylonitrile is polymerized in combination with acrylic acid, maleic acid, vinylsulfonic acid and other anionic unsaturated compounds or acrylamide. Formed during the polymerization are gels, which without prior isolation are saponified or neutralized by addition of the desired alkali-metal hydroxide and alcohol (Examples 37 to 47).

Various polysaccharides such as cellulose, carboxymethyl cellulose (CMC), hydroxyethyl cellulose (HEC), hydroxypropyl cellulose (HPC), methyl cellulose (MC), ethyl cellulose (EC), starch, starch ethers, e.g., carboxymethyl starch (CMS), sodium alginate, guar gum or even other hydroxy-group-containing polymers such as polyvinyl alcohol can be admixed with the unsaturated compounds, these reacting with the saturated compounds to form graft polymers (Examples 48 to 59). Particularly suitable for the one-stage process are mixers, especially Drais Co. mixers, since after the polymerization a gel-like product is obtained.

The acrylonitrile content in these hydrogels must not be less than 10%, since otherwise only soluble products are formed.

The polymers synthesized using the reaction mixtures/conditions described above swell only very slowly in water and aqueous salt solutions, unless a metal oxide is added during the saponification.

The reaction mixture/conditions during the polymerization are preferably:
acrylonitrile content: 10 to 95, preferably 15 to 80 weight percent
unsaturated acid component content: 5 to 90, preferably 10 to 85 weight percent
unsaturated, neutral component content: 1 to 50, preferably 2 to 25 weight percent
saturated, hydroxy-group-containing component content: 1 to 50, preferably 2 to 25 weight percent
reaction medium: water
reaction temperature: 30° to 80° C., preferably 40° to 60° C.
initiator: standard
reaction apparatus: kneader The reaction mixture/conditions during the saponification or neutralization are preferably:
admixture of the metal oxide
alkali: sodium hydroxide, potassium hydroxide
alkali proportion: 0.5 to 1.5, preferably 1 to 1.25 mole per mole of component to be saponified
reaction medium: water/alcohol with 1 to 4 C atoms (alcohol: preferably methanol or ethanol)
water content: 10 to 70 volume percent, preferably 30 to 50%
reaction temperature: reflux temperature The swelling properties of the synthesized compositions are determined by
(i) the porous-plate test (Johnson and Johnson Co.)
(ii) the demand test (B. M. Lichstein, INDA 2nd Annual Symposium, Nonwoven Product Development, Mar. 5 and 6, 1974, Washington, D.C.) and
(iii) the so-called glass-frit test in which the test substance is mixed in a glass beaker with an excess of the desired liquid, e.g., demineralized water, or with a physiological fluid, and allowed to swell for ½ hour. Thereafter the contents of the glass beaker are decanted onto a G1 glass frit; as soon as excess liquid no longer flows off (usually after 2 to 4 hours), the absorbed quantity of liquid is determined by weighing.

The measured results show that the products of the invention swell both very strongly and very rapidly with water. Therefore they are particularly well-suited for applications in which a small quantity of gelling agent (possibly in a thin layer) is supposed to absorb suddenly a large quantity of water. This is the case in the hygiene area, especially for diapers. However, the product of the invention is also of great importance for special areas of agriculture, e.g., for flat-roof sowing. The potassium and nitrogen content is then also of importance.

Compared with the process described in West German Laid-Open Application No. 3,503,458, the process of the invention has the advantage that the therein essential cross-linking reactions of the gelling agent in the swollen state and in the presence of the metal oxide are not necessary.

EXAMPLE 1

(a) Polymerization

In a 2-liter three-necked flask, equipped with stirrer, reflux condenser, 2 dropping funnels and thermometer, 5 g of silica gel (fine-pored) were suspended with vigorous stirring in 1 liter of water. The apparatus was then purged for ½ hr with nitrogen. Thereafter, 100 g of freshly distilled acrylonitrile and 70 ml of ammonium cerium nitrate solution (13.7 g of ammonium cerium nitrate and 25 g of 65% nitric acid in 250 ml of water) were rapidly added to the reaction mixture in succession from the dropping funnels. The reaction mixture heated up within ½ hr to 40° to 45° C., and the initial yellow coloration vanished rapidly. The mixture was further stirred at this temperature for 3 hr, until a slurry which was no longer stirrable was formed. After cooling, normally over night, the reaction product was sucked off, washed with water and dried at 70° C. in the vacuum drying oven.

Yield: 100 g (95.2% of theoretical)

(b) Saponification

In a 2-liter three-necked flask with stirrer and reflux condenser, 30 g of polymer and 30 g of potassium hydroxide were added to a mixture of 150 ml of water and 640 ml of ethanol (19:81). The mixture was then boiled under reflux. In the process, a dark-brown coloration rapidly developed, and disappeared again with continuing reaction. After 24 hr the reaction mixture was neutralized with acetic acid, the slightly yellow product was sucked off, first washed twice with ethanol/water (90:10), then three times with pure ethanol, and dried in the vacuum drying oven at 70° C.

Yield: 38 g (95.5% of theoretical)
$SiO_2$ content: 2.4%
N content: 0.5%
Acyl amide group content: 1.57%

The composition synthesized by the procedure described above swelled particularly rapidly in water and aqueous salt solutions and exhibited the following swelling values:

Porous-plate test:
Absorption after 30 min: 42 ml of a 1% NaCl solution per g of composition
Demand test:
Absorption after 30 min: 45 ml of artificial urine per g of composition
Glass-frit test:
47 ml of artificial urine per g of composition
580 ml of demineralized water per g of composition

EXAMPLES 2 TO 9

On the basis of the mode of operation of Example 1 and the reaction conditions of Table 1, starting from acrylonitrile and various quantities as well as types of silicic acid, the compositions listed in Table 1 were synthesized by saponification of the polymer with potassium hydroxide.

TABLE 1

| (a) Polymerization conditions | (b) Saponification conditions |
|---|---|
| Reaction medium: 1000 ml of water | Reaction medium: water/ethanol (19:81 volume percent, 10 parts per one part polymer) |
| Initiator: 70 ml of ammonium cerium nitrate solution | Reaction temperature: reflux |
| Reaction temperature: 40 to 45° C. | Reaction time: 24 hr |
| Reaction time: 6 hr | Saponification with: potassium hydroxide (1 mole KOH/1 mole acrylonitrile) |

| | Starting products | | Yield after polymerization g | % of theory | after saponification g | % of theory | Swelling capacity Glass-frit test ml artificial urine per g composition | ml demineralized $H_2O$ per g composition |
|---|---|---|---|---|---|---|---|---|
| Example No. | g acrylonitrile | g silicic acid | | | | | | |
| 2 | 100 | 5 silicic acid | 102 | 97.1 | 201 | 97.4 | 55 | 475 |
| 3 | 100 | 10 silicic acid | 103 | 93.6 | 195 | 96.1 | 49 | 465 |
| 4 | 100 | 50 silicic acid | 140 | 93.3 | 225 | 95.0 | 25 | 120 |
| 5 | 100 | 5 silica gel (coarse-pored) | 103 | 98.1 | 200 | 96.9 | 54 | 500 |
| 6 | 100 | 10 silica gel (coarse-pored) | 105 | 95.1 | 198 | 97.5 | 45 | 440 |
| 7 | 100 | 5 Aerosil[1] | 101 | 96.2 | 200 | 97.9 | 43 | 430 |
| 8 | 100 | 50 Aerosil[1] | 145 | 96.7 | 235 | 95.1 | 30 | 100 |
| 9 | 100 | 100 Aerosil[1] | 190 | 95.0 | 270 | 94.1 | 24 | 45 |

[1]Sold under this trademark is a silicic acid prepared by hydrolysis of silicon tetrachloride in an oxyhydrogen flame and having a $SiO_2$ content of more than 99.8%.

EXAMPLE 10

(a) Polymerization

In a 4-liter three-necked flask, equipped with stirrer, reflux condenser, 2 dropping funnels and thermometer, 5 g of silicic acid were suspended, with vigorous stirring, in 2 liters of water. After the apparatus had been purged for ½ hr with nitrogen, 200 g of freshly distilled acrylonitrile and 6 g of ammonium peroxydisulfate, dissolved in 50 ml of water, were rapidly added to the reaction mixture in succession from the dropping funnels, the reaction solution was heated within ½ hr to 40° to 45° C. and further stirred for 6 hr at this temperature. After cooling, the reaction product was sucked off, washed once with water and dried at 70° C. in the vacuum drying oven.

Yield: 198 g (96.6% of theoretical)

(b) Saponification 500 ml of water and 1500 ml of methanol were placed in a 4-liter three-necked flask with stirrer and reflux condenser, and 150 g of polymer and 150 g of sodium hydroxide were added. The reaction mixture was heated for 20 hr under reflux, sucked off, washed to neutrality with methanol and dried in the vacuum drying oven at 70° C.

Yield: 240 g (91.3% of theoretical)
SiO$_2$ content: 1.5%
N content: 2.5%
Acyl amide group content: : 7.86%

The composition synthesized in this way swelled spontaneously in water and aqueous salt solutions and exhibited the following swelling values:
  Porous-plate test:
    Absorption after 30 min: 48 ml of 1% NaCl solution per g of composition

EXAMPLES 11 TO 14

On the basis of the mode of operation of Example 10 and the reaction conditions of Table 2, the compositions listed in Table 2 were synthesized on the basis of acrylonitrile and silicic acid.

TABLE 2

| (a) Polymerization conditions | (b) Saponification conditions |
|---|---|
| Reaction medium: 1000 ml of water | Reaction medium: water/ethanol |
| Initiator: 3 g of ammonium peroxydisulfate | (22:78 volume percent, 10 parts per 1 part polymer) |
| Reaction temperature: 40 to 45° C. | Reaction temperature: reflux |
| Reaction time: 6 hr | Reaction time: 24 hr |
| | Saponification with: NaOH or KOH |
| | (1.2 mole per mole acrylonitrile) |

| | Polymerization Starting products | | | | Saponification | | | Property Porous-plate test ml 1% NaCl solution per |
|---|---|---|---|---|---|---|---|---|
| Example No. | g acrylonitrile | g silicic acid | Yield g | % of theory | Agent | Yield g | % of theory | g composition Absorption after 30 min |
| 1 | 100 | 2.5 | 101 | 98.5 | KOH | 198 | 95.7 | 39 |
| 2 | 100 | 5.0 | 102 | 97.1 | NaOH | 172 | 96.1 | 46 |
| 3 | 100 | 2.5 Silica gel | 100 | 97.6 | NaOH | 169 | 96.3 | 46 |
| 4 | 100 | 5.0 Silica gel | 101 | 96.2 | NaOH | 170 | 94.9 | 43 |

EXAMPLE 15

(a) Polymerization

In a 2-liter three-necked flask, equipped with stirrer, reflux condenser, 2 dropping funnels and thermometer, 2.5 g of alumina were suspended, with stirring. After purging of the apparatus with nitrogen, 100 g of freshly distilled acrylonitrile and 3 g of ammonium peroxydisulfate, dissolved in 25 ml of water, were rapidly added to the reaction mixture in succession from the dropping funnels, the reaction solution was heated within ½ hr to 40° to 45° C. and maintained for 6 hr at this temperature. On the next day, the reaction product was sucked off, washed with water and dried at 70° C. in the vacuum drying oven.
  Yield: 96 g (93.7%).

(b) Saponification 250 ml of water and 750 ml of methanol were placed in a 2-liter three-necked flask with stirrer and reflux condenser, and 90 g of polymer and 90 g of sodium hydroxide were added. The reaction mixture was heated for 20 hr under reflux, sucked off, washed to neutrality with methanol and dried in the vacuum drying oven at 70° C.
  Yield: 130 g (95.1% of theoretical)
  Al$_2$O$_3$ content: 1.45%
  N content: 5.2%
  Acyl amide group content: : 16.34%
  Porous-plate test:
    Absorption after 30 min: 43 ml of 1% NaCl solution per g of composition

EXAMPLES 16 TO 20

On the basis of the mode of operation of Example 1, 206 g (98.1% of theoretical) of cross-linked polymer was synthesized from 200 g of acrylonitrile and 10 g of silica gel (finepored). Starting from this polymer, compositions with different acyl amide content were then synthesized according to the reaction conditions listed in Table 3 and the swelling capacity thereof determined.

TABLE 3

Swelling capacity as a function of acyl amide group content of the composition

| Charge: | 40 g of polymer |
| | 40 g of potassium hydroxide |
| | 800 ml of water/ethanol (19:81) |
| | Reaction temperature: reflux |

| Example | Saponification time hr | Acyl amide content % | Glass-frit test with demineralized water per g composition ml | artificial urine per g composition ml |
|---|---|---|---|---|
| 16 | 1 | 60 | 85 | 20 |
| 17 | 2 | 28 | 265 | 36 |
| 18 | 4 | 16 | 380 | 55 |
| 19 | 40 | 2 | 545 | 50 |
| 20 | 60 | 1 | 600 | 45 |

The results showed clearly that the product which was extensively saponified had the maximum water absorption. The urine absorption also increased at first and then decreased again at complete saponification.

EXAMPLE 21

(a) Polymerization

Figure 2:
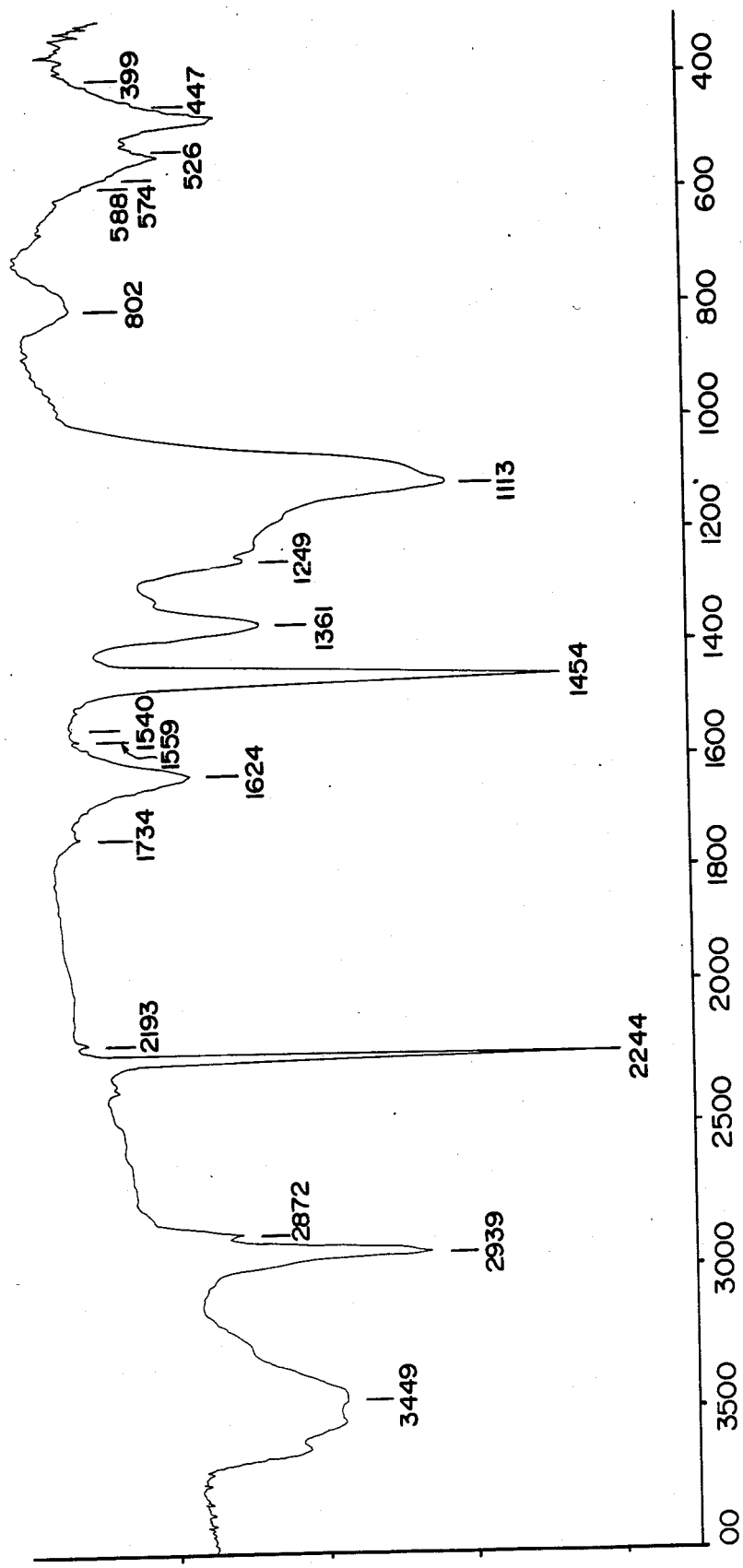
FIG. 2 is an IR spectrum of the polymerization product of Example 21(a)

In a 20-liter round-bottomed flask, equipped with stirrer, reflux condenser, 2 dropping funnels and thermometer, 32.5 g of precipitated silicic acid were suspended, with vigorous stirring, in 13 liters of water. The apparatus was purged for 1 hr with nitrogen. Thereafter, 1300 g of acrylonitrile and 910 ml of ammonium cerium nitrate solution (see Example 1) were rapidly added in succession from the dropping funnels, the reaction mixture was heated to 50° C. and stirred at this temperature for 6 hr. After cooling, the reaction product was sucked off, washed with water and dried at 70° C. in the vacuum drying oven.
  Yield: 1315 g (98.7% of theoretical; IR spectrum No. 1 (FIG. 2)).

(b) Saponification

In a 20-liter round-bottomed flask with stirrer and reflux condenser, 1300 g of polymer and 1300 g of sodium hydroxide were added to a mixture of 3.25 liters of water and 9.75 liters of methanol (25:75), and the mixture was boiled for 20 hr under reflux. After cooling, the reaction product was sucked off, washed four times with methanol/water (90:10), then once with absolute methanol, and dried in the vacuum drying oven at 70° C.

Figure 3:
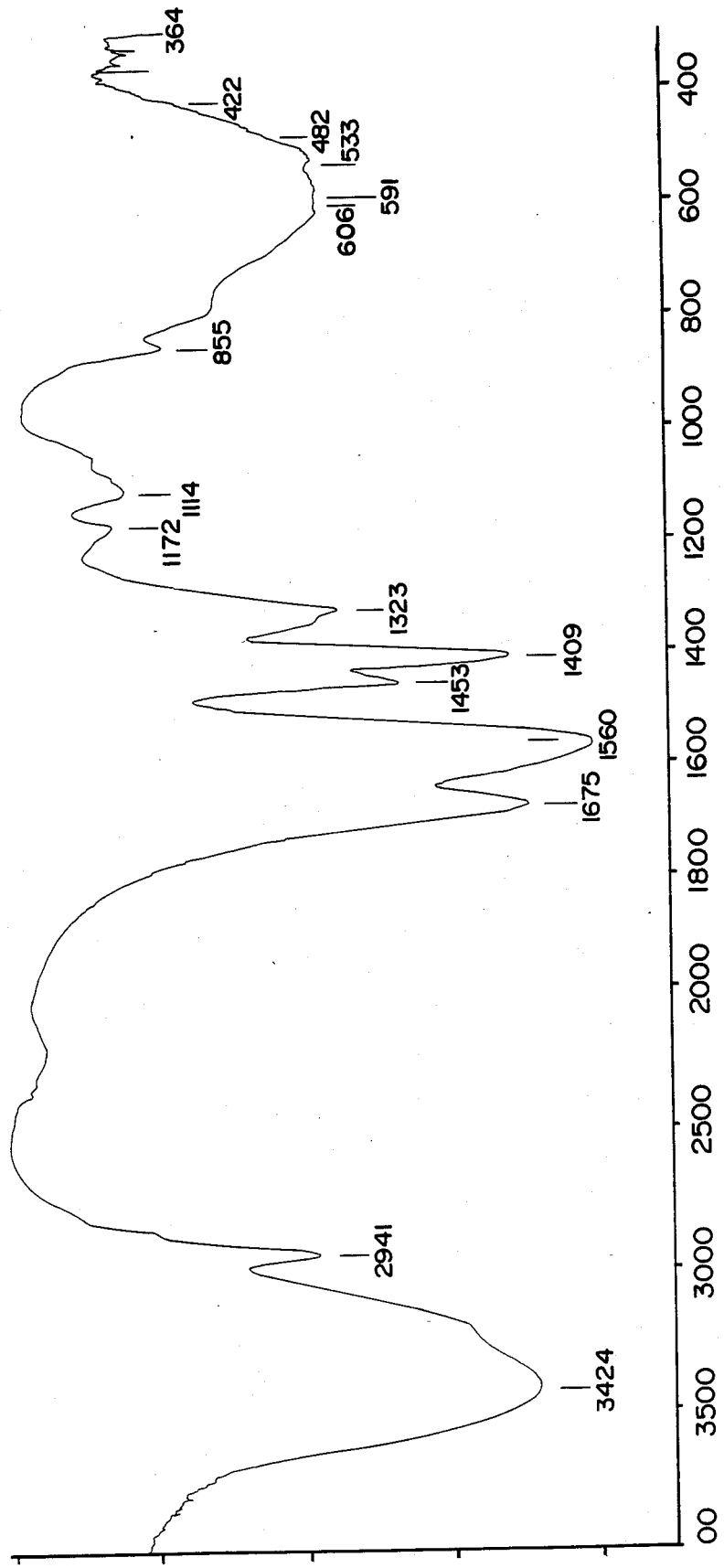
FIG. 3 is an IR spectrum of the saponification product of Example 21(b)
Figure 4A:
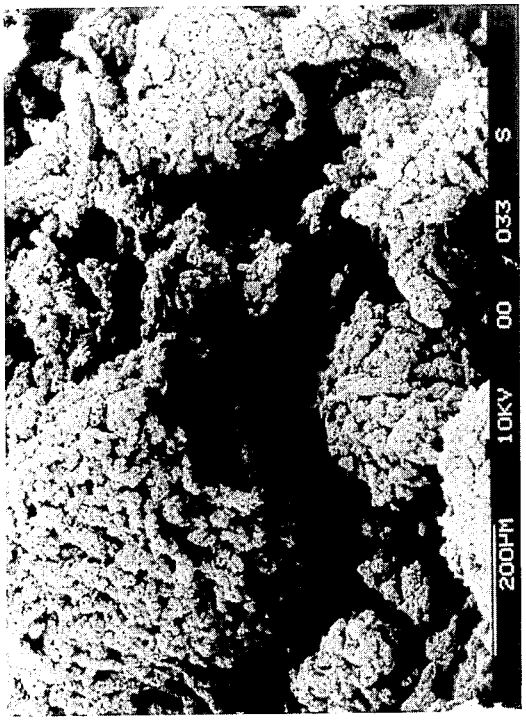
FIG. 4(A) is a photomicrograph of the composition of Example 22 at a magnification of 100:1.
Figure 4B:
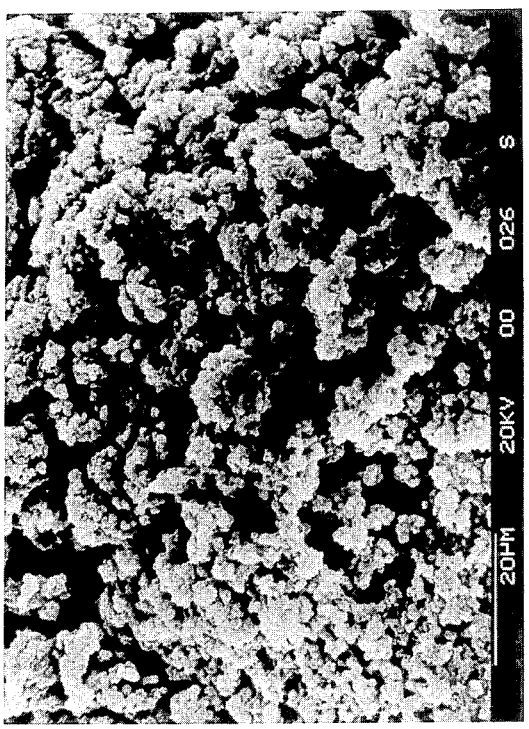
FIG. 4(B) is a photomicrograph of the composition of Example 22 at a magnification of 1000:1.
Figure 4C:
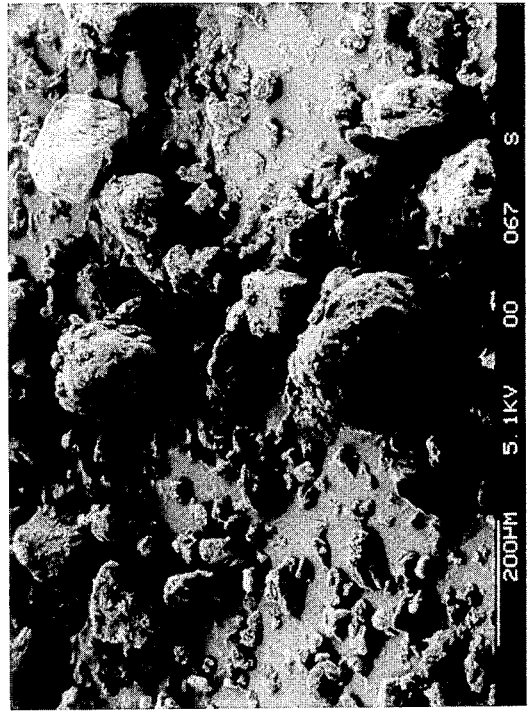
FIG. 4(C) is a photomicrograph of the composition of Example 48 at a magnification of 100:1.
Figure 4D:
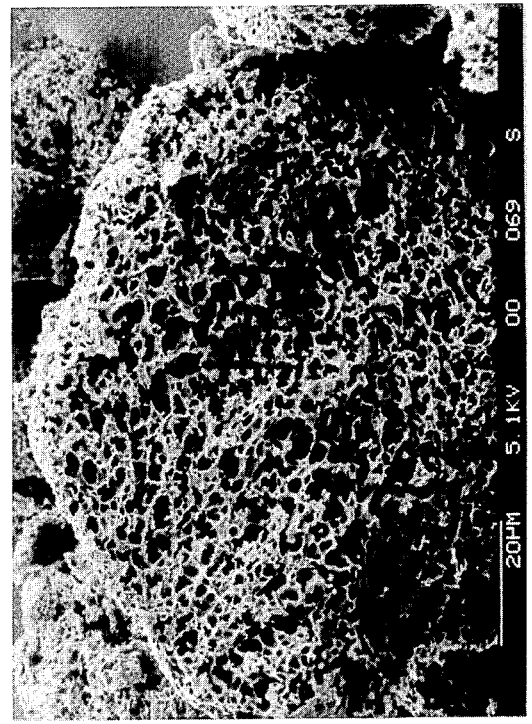
FIG. 4(D) is a photomicrograph of the composition of Example 48 at a magnification of 1000:1.

Yield: 2160 g (99.1% of theoretical, IR spectrum No. 2 (FIG. 3))

N content: 4.8%

Acyl amide group content: : 15.1%

The composition synthesized in this way swelled very rapidly in water and aqueous salt solutions (FIG. 1).

Swelling capacity

Porous-plate test:
Absorption after 30 min: 52 ml of 1% NaCl solution per g of composition Demand test:
Absorption after 30 min: 56 ml of 1% NaCl solution per g of composition Glass-frit test:
61 ml of 1% NaCl solution per g of composition
440 ml of demineralized water per g of composition

EXAMPLE 22

(a) Polymerization

In a 20-liter round-bottomed flask, equipped with stirrer, reflux condenser, 2 dropping funnels and thermometer, 32.5 g of precipitated silicic acid were suspended, with vigorous stirring, in 13 liters of water containing 100 ml of concentrated nitric acid. The apparatus was purged for 1 hr with nitrogen. Thereafter, 1300 g of acrylonitrile and 39 g of ammonium peroxydisulfate, dissolved in 125 ml of water, were rapidly added in succession from the dropping funnels. The reaction mixture was heated up to 50° C. and stirred at this temperature for 6 hr. After cooling, the reaction product was sucked off, washed with water and dried at 70° C. in the vacuum drying oven.

Yield: 1310 g (98.3% of theoretical)

(b) Saponification

In a 20-liter round-bottomed flask with stirrer and reflux condenser, 1300 g of polymer and 1300 g of sodium hydroxide were added to a mixture of 3.64 liters of water and 9.36 liters of methanol (28:72), and the mixture was boiled for 20 hr under reflux. After cooling, the reaction product was sucked off, washed four times with methanol/water (90:10), then once with absolute methanol, and dried in the vacuum drying oven at 70° C.

Yield: 2140 g (97.9% of theoretical)

N content: 4.6%

Acyl amide group content: 14.46%

Structure:

The composition has a spongy structure.

The surface is rugged in the manner of a walnut (see FIG. 4).

Swelling capacity

Porous-plate test:
Absorption after 30 min: 54 ml of 1% NaCl solution per g of composition Demand test:
Absorption after 30 min: 56 ml of 1% NaCl solution per g of composition Glass-frit test:
61 ml of 1% NaCl solution per g of composition
485 ml of demineralized water per g of composition The composition synthesized in this way swelled very rapidly in water and aqueous salt solutions (FIG. 1).

EXAMPLES 23 TO 25

On the basis of the mode of operation of Example 22 and the reaction conditions of Table 4, the compositions listed in Table 4 were synthesized on the basis of acrylonitrile and silicic acid with various initiators.

TABLE 4

| (a) Polymerization conditions | (b) Saponification conditions |
|---|---|
| Starting products: 1300 g acrylonitrile<br>32.5 g silicic acid, precipitated | Reaction medium: water/methanol<br>(28:72 volume percent, 10 parts per 1 part polymer) |
| Reaction medium: 13 liters of water<br>Reaction temperature: 50° C.<br>Reaction time: 6 hr<br>Initiator addition time: 4 hr | Reaction temperature: reflux<br>Reaction time: 20 hr<br>Saponification with: NaOH (1 mole per 1 mole acrylonitrile) |

| Example | Initiator type | g | dissolved in ml water | Yield g | % | Saponification product Yield g | % | N content % | —$CONH_2$ content % | Porous-plate test ml 1% NaCl solution per g composition Absorption after 30 min |
|---|---|---|---|---|---|---|---|---|---|---|
| 22 | Ammonium peroxydisulfate | 1 | 100 | 1250 | 93.8 | 2000 | 95.5 | 4.9 | 15.4 | 53 |
| 24 | Potassium peroxydisulfate +<br>Sodium hydrogen sulfite | 10<br>+<br>192 | 100<br><br>100 | 1320 | 99.1 | 2180 | 98.7 | 5.1 | 16.0 | 52 |
| 25 | Potassium peroxydisulfate +<br>Sodium formaldehyde sulfoxylate | 17.5<br>+<br>0.9 | 100<br><br>100 | 1315 | 98.7 | 2150 | 98.1 | 5.5 | 17.3 | 47 |

EXAMPLE 26

(comparison)

(a) Polymerization 100 g of acrylonitrile and 2.5 g of silicic acid were polymerized by the mode of operation of Example 10. In the process, 100 g (97.6% of theoretical) of polymer were obtained and were saponified to polyacrylamide by the following procedure.

(b) Saponification 10 g of polymer was suspended in 400 ml of 85% sulfuric acid and stirred for 5 hr at 15° to 20° C. The reaction product was sucked off, washed to neutrality with methanol and dried at 70° C. in the vacuum drying oven.

Yield: 12.0 g (91.9% of theoretical)
Porous-plate test:
Absorption after 30 min: 25 ml of 1% NaCl solution per g of composition.

EXAMPLES 27 TO 29

On the basis of the mode of operation of Example 10 and the reaction conditions of Table 5, the compositions with gelling agents from copolymers, listed in Table 1, were synthesized from acrylonitrile and silicic acid and acrylic acid ethyl ester or vinyl acetate or styrene.

washed first with 10% aqueous methanol, then to neutrality with absolute methanol and dried at 70° C. in the vacuum drying oven.

Yield: 170 g (98.1% of theoretical)
N content: 2.5%
Acyl amide group content: 7.85%

Swelling capacity

Porous-plate test:
Absorption after 30 min: 8 ml of 1% NaCl solution per g of gelling agent
Demand test:
Absorption after 30 min: 10 ml of 1% NaCl solution per g of gelling agent (c) Saponification with potassium hydroxide The saponification with potassium hydroxide was conducted by the mode of operation described in Example 30(b). In the process, 191.5 g (95.3% of theoretical) of the potassium salt with an N content of 2.4% (corresponding to an acyl amide group content of 7.54%) was obtained from 100 g of polymer and 100 g of potassium hydroxide.

Swelling capacity

Porous-plate test:
Absorption after 30 min: 10 ml of 1% NaCl solution per g of gelling agent

TABLE 5

| (a) Polymerization conditions | | | (b) Saponification conditions | | | | |
|---|---|---|---|---|---|---|---|
| Reaction medium: 1000 ml of water | | | Reaction medium: water/methanol | | | | |
| Initiator: 3 g of $(NH_4)_2S_2O_8$ in 100 ml of water | | | (25:75 volume percent, 10 parts per 1 part polymer) | | | | |
| Addition time: 6 hr | | | Reaction temperature: reflux | | | | |
| Reaction temperature: 50 to 55° C. | | | Reaction time: 20 hr | | | | |
| | | | Saponification with: NaOH (1.25 mole per mole monomer) | | | | |

| | Starting products | | g silicic acid, precipitated | Yield g | % of theory | Saponification | | Porous-plate test ml 1% NaCl per g composition Absorption after 30 min |
| Example | g acrylo-nitrile | g comonomer | | | | product g | % of theory | |
|---|---|---|---|---|---|---|---|---|
| 27 | 85 | 15 Acrylic acid ethyl ester | 2.5 | 95 | 92.7 | 145 | 93.5 | 45 |
| 28 | 85 | 15 Vinyl acetate | 2.5 | 90 | 87.8 | 125 | 90.8 | 39 |
| 29 | 90 | 10 Styrene | 2.5 | 94 | 91.7 | 140 | 91.0 | 35 |

EXAMPLE 30

(comparison example)

(a) Polymerization 3 liters of water were placed in a 4-liter three-necked flask, equipped with stirrer, reflux condenser, 2 dropping funnels and thermometer. The apparatus was purged for ½ hr with nitrogen, and thereafter 300 g of freshly distilled acrylonitrile and 180 ml of ammonium cerium nitrate (see Example 1) were added in succession from the dropping funnels, the reaction mixture was heated to 50° C., and maintained for 6 hr at this temperature. After cooling, the reaction product was sucked off, washed with water and dried at 70° C. in the vacuum drying oven.

Yield: 295.5 g (98.5% of theoretical)

(b) Saponification with sodium hydroxide 150 ml of water and 850 ml of ethanol were placed in a 2-liter three-necked flask with stirrer and reflux condenser, and 100 g of polymer and 100 g of sodium hydroxide were added. The reaction mixture was heated for 20 hr under reflux, the product was sucked off, Demand test:
Absorption after 30 min: 13 ml of 1% NaCl solution per g of gelling agent

EXAMPLE 31 (comparison example)

(a) Polymerization 2 liters of water were placed in a 4-liter three-necked flask, equipped with stirrer, reflux condenser, 2 dropping funnels and thermometer. The apparatus was purged for ½ hr with nitrogen. Thereafter 200 g of freshly distilled acrylonitrile and 6 g of ammonium peroxydisulfate, dissolved in 50 ml of water, were rapidly added in succession from the dropping funnels. The reaction mixture was heated to 50° C. and was maintained for 6 hr at this temperature. After cooling, the reaction product was sucked off, washed with water and dried at 70° C. in the vacuum drying oven.

Yield: 197.6 g (98.8% of theoretical)

(b) Saponification 250 ml of water and 750 ml of methanol were placed in a 2-liter three-necked flask with stirrer and reflux condenser, and 100 g of polymer and 100 g of sodium hydroxide were added. The reaction mixture was heated for 20 hr under reflux, the product was sucked off, washed with 10% aqueous methanol and to neutrality with absolute methanol and dried at 70° C. in the vacuum drying oven.

Yield: 163.5 g (96.6% of theoretical)
N content: 5.0%
Carboxylic acid amide group content: 15.71%

Swelling capacity

Porous-plate test:
Absorption after 30 min: 6 ml of 1% NaCl solution per g of gelling agent
Demand test:
Absorption after 30 min: 8 ml of 1% NaCl solution per g of gelling agent

EXAMPLES 32 TO 36

The pronounced water-blocking effect of the gelling agent without any addition of metal oxides can also be avoided if the metal oxide is added to the saponification charge. The so-synthesized compositions have a much higher swelling rate and swelling capacity than the corresponding gelling agents alone. By this procedure, compositions with satisfactory swelling properties can be obtained from the polymers of Example 31 by addition of metal oxides (see Table 6).

TABLE 6

| Example | Filler type | Quantity % | Porous-plate test Absorption after 30 min: ml 1% NaCl solution per g composition |
|---|---|---|---|
| 32 | Silicic acid, precipitated | 1 | 24 |
| 33 | Silicic acid, precipitated | 2.5 | 39 |
| 34 | Silicic acid, precipitated | 5 | 47 |
| 35 | Silicic acid, precipitated | 10 | 40 |
| 36 | Product from Example 22 | 30 | 52 |

EXAMPLE 37

3 liters of water were placed in a 10-liter Drais Co. mixer, equipped with reflux condenser and 2 dropping funnels. The apparatus was purged for 1 hr with nitrogen. Thereafter a mixture of 80 g of acrylonitrile and 320 g of acrylic acid and 12 g of ammonium peroxydisulfate, dissolved in 100 ml of water, were rapidly added in succession from the dropping funnels, the mixture was heated to 55° C. and polymerized at this temperature for 4 hr. Thereafter 260 g of sodium hydroxide, 4 liters of methanol and 27 g of silicic acid were added and the reaction mixture was boiled for 6 hr under reflux. After cooling, the reaction product was sucked off, washed with to neutrality with methanol and dried in the vacuum drying oven at 70° C.

Yield: 572 g (97.4% of theoretical)

Swelling capacity

Porous-plate test:
Absorption after 30 min: 45 ml of 1% NaCl solution per g of composition

EXAMPLES 38 TO 47

On the basis of the mode of operation of Example 37 and the reaction condition of Table 7, the composition of Table 7 are synthesized.

TABLE 7

(a) Polymerization conditions
Reaction medium: 3 liters of water
Initiator: 12 g of ammonium peroxydisulfate, dissolved in 100 ml of water
Reaction temperature: 55° C.
Reaction time: 4 hr (b) Neutralization/saponification
Reaction medium: water/methanol = 44/56
Alkali: sodium hydroxide
Reaction temperature: reflux
Reaction time: 20 hr
Silica: 20 g

| Example | Monomer 1 | Parts | Monomer 2 | Parts | g | Yield % of theory | Porous-plate test: Absorption after 30 min., ml 1% NaCl solution per g composition |
|---|---|---|---|---|---|---|---|
| 38 | Acrylonitrile | 160 | Acrylic acid | 240 | 570 | 92.7 | 46 |
| 39 | Acrylonitrile | 240 | Acrylic acid | 160 | 610 | 94.5 | 47 |
| 40 | Acrylonitrile | 320 | Acrylic acid | 80 | 665 | 97.1 | 49 |
| 41 | Acrylonitrile | 320 | Methacrylic acid | 80 | 650 | 95.4 | 43 |
| 42 | Acrylonitrile | 240 | Methacrylic acid | 160 | 580 | 90.3 | 40 |
| 43 | Acrylonitrile | 360 | Maleic anhydride | 40 | 610 | 84.9 | 42 |
| 44 | Acrylonitrile | 320 | Maleic anhydride | 80 | 590 | 82.6 | 41 |
| 45 | Acrylonitrile | 320 | Acrylamide | 80 | 620 | 93.8 | 40 |
| 46 | Acrylonitrile | 360 | Vinylsulfonic acid | 40 | 630 | 90.0 | 38 |
| 47 | Acrylonitrile | 360 | Carboxymethyl Cellulose | 40 | 660 | 95.6 | 45 |

EXAMPLE 48

In a 10-liter Drais Co. mixer, equipped with reflux condenser and 2 dropping funnels, 10 g of cross-linked carboxymethyl cellulose with a degree of substitution of 0.75 was suspended in 4 liters of water. The apparatus was purged for 1 hr with nitrogen. Thereafter a mixture of 60 g of acrylonitrile and 330 g of acrylic acid and 260 ml of ammonium cerium nitrate solution (see Example 1) were rapidly added in succession from the dropping funnels, the mixture was heated to 55° C. and was stirred for 4 hr at this temperature. Thereafter, 310 g of potassium hydroxide, 5 liters of methanol and 20 g of silicic acid were added and the reaction mixture boiled for 6 hr under reflux. After cooling, the reaction product was sucked off, washed to neutrality with methanol and dried in the vacuum drying oven at 70° C.

The composition had a spongy structure (see FIG. 4).
Yield: 630 g (95.6% of theoretical)
N content: 1.5%
Acyl amide group content: 4.71%

Swelling capacity

Porous-plate test:
Absorption after 30 min: 55 ml of 1% NaCl solution per g of composition
Swelling rate: see FIG. 1

EXAMPLES 49 AND 50

On the basis of the mode of operation of Example 48 and the reaction conditions of Table 8, the compositions of Table 8 were synthesized.

homo- or copolymers of acrylonitrile with an alkali-metal hydroxide only to an acyl-amide-group content of 1 to 22%.

7. The process according to claim 6, wherein the homo- or copolymers of acrylonitrile are saponified with sodium or potassium hydroxide in a proportion of 0.5 to 1.5 mole per mole of component to be saponified.

8. The process according to claim 7, wherein said proportion is 1.0 to 1.25.

9. The process according to claim 4, wherein acrylonitrile alone or together with at least one unsaturated compound is first polymerized to a product which is at most only slightly swellable in water, and which is then partly saponified to synthesize said gelling agent.

10. The process according to claim 9, wherein said unsaturated compound is at least one member selected from the group consisting of vinyl acetate, styrene and acrylic acid or methacrylic acid esters.

TABLE 8

(a) Polymerization conditions
Reaction medium: 4 liters of water
Initiator: 12 g of ammonium peroxydisulfate, dissolved in 100 ml of water
Reaction temperature: 55° C.
Reaction time: 4 hr (b) Neutralization/saponification
Reaction medium: water/methanol = 44/56
Alkali: sodium hydroxide
Reaction temperature: reflux
Reaction time: 10 hours
Silica: 20 g

| Example | Monomer 1 | Parts | Monomer 2 | Parts | HO—group content of polymer | Parts | Yield g | % of theory | Porous-plate test Absorption after 30 min ml 1% NaCl solution per g of composition |
|---|---|---|---|---|---|---|---|---|---|
| 48 | Acrylonitrile | 60 | Acrylic acid | 340 | CMC | 20 | 520 | 92.1 | 48 |
| 49 | Acrylonitrile | 120 | Acrylic acid | 240 | CMC | 40 | 530 | 90.5 | 45 |
| 50 | Acrylonitrile | 120 | Acrylic acid | 240 | Cellulose | 40 | 535 | 91.4 | 39 |
| 51 | Acrylonitrile | 120 | Acrylic acid | 240 | HEC | 40 | 525 | 89.7 | 42 |
| 52 | Acrylonitrile | 120 | Acrylic acid | 240 | HPC | 40 | 520 | 88.8 | 38 |
| 53 | Acrylonitrile | 120 | Acrylic acid | 240 | MC | 40 | 540 | 92.3 | 40 |
| 54 | Acrylonitrile | 120 | Acrylic acid | 240 | EC | 40 | 530 | 90.5 | 39 |
| 55 | Acrylonitrile | 120 | Acrylic acid | 240 | Starch | 40 | 540 | 92.3 | 41 |
| 56 | Acrylonitrile | 120 | Acrylic acid | 240 | CMS | 40 | 535 | 91.4 | 44 |
| 57 | Acrylonitrile | 120 | Acrylic acid | 240 | Alginate | 40 | 530 | 90.5 | 45 |
| 58 | Acrylonitrile | 120 | Acrylic acid | 240 | Guar gum | 40 | 505 | 86.1 | 42 |
| 59 | Acrylonitrile | 120 | Acrylic acid | 240 | PVA | 40 | 510 | 87.0 | 40 |

We claim:

1. A water-swellable composition of a gelling agent comprising non-crosslinked hydrolyzed homo-or copolymers of acrylonitrile and of a inert metal oxide, wherein 1 to 22% of the nitrile groups are saponified to amide groups and the remaining 99 to 78% to alkali-metal salts.

2. The composition according to claim 1, wherein said metal oxide comprises finely divided silicic acid in a proportion of 1 to 50, preferably 2 to 10 weight percent, relative to the weight of the composition.

3. The composition according to claim 1, wherein said composition is pulverulent and has a porous structure with pore diameters in the range of 0.5 to 10 microns.

4. A process for synthesis of a water-swellable composition of a gelling agent comprising homo- or copolymers of acrylonitrile and an inert metal oxide, comprising synthesizing said gelling agent in the presence of said metal oxide and partially saponifying said gelling agent to convert from 1 to 22% of the nitrile groups to amide groups and the remaining 99% to 78% of said nitrile groups to alkali metal salts.

5. The process according to claim 4, wherein the metal oxide is finely divided SiO$_2$ and is added in a proportion of 1 to 50, relative to the weight of the composition.

6. The process according to claim 4, wherein the gelling agent is synthesized by saponification of the 11. The process according to claim 4, wherein said homo- or copolymers of acrylonitrile have an acrylonitrile content of 50 to 99 weight percent and a content of comonomers of 0 to 30 weight percent relative to the weight of the composition.

12. The process according to claim 11, wherein said acrylonitrile content is 85 to 98 weight percent relative to the weight of the composition.

13. The process according to claim 6, wherein said saponification is carried out in a saponification medium which is a mixture of water and alcohol with 1 to 4 C atoms, and the water content is 5 to 40 volume percent.

14. The process according to claim 13, wherein said alcohol is selected from the group consisting of methanol and ethanol, and said water content is 10 to 30 volume percent.

15. The process according to claim 4, wherein the metal oxide is present during homo- or copolymerization of said homo- or copolymers of acrylonitrile.

16. The process according to claim 6, wherein the metal oxide is added during the saponification.

17. The process according to claim 4, wherein said gelling agent is synthesized by polymerizing acrylonitrile together with at least one member selected from the group consisting of unsaturated compounds and a saturated hydroxy group containing polymer, and then partly saponifying said gelling agent.

18. The process according to claim 17, wherein said unsaturated compounds are selected from the group consisting of acrylic acid, maleic acid, vinylsulfonic acid and acrylamide, and said saturated polymer is carboxymethyl cellulose.

19. The process according to claim 17, wherein a content of acrylonitrile is 10 to 95%, a content of acid unsaturated compounds is 5 to 90%, a content of neutral unsaturated compounds is 1 to 50%, and a content of saturated hydroxy-group-containing polymer is 1 to 50%.

20. The process according to claim 19, wherein the content of acrylonitrile is 15 to 80%, the content of acid unsaturated compounds is 10 to 85%, the content of neutral unsaturated compounds is 2 to 25%, and the content of saturated hydroxy-group-containing polymer is 2 to 25%.

21. The process according to claim 6, wherein the metal oxide is present only during the saponification.

22. A water-swellable composition of a gelling agent synthesized by the process of claim 4.

23. The composition of claim 2 wherein said silicic acid is present in a proportion of from 2 to 10 weight percent relative to the weight of said composition.

24. The process of claim 5 wherein the $SiO_2$ is added in a proportion of from 2 to 10 weight percent.

25. The composition of claim 1 wherein said nitrile groups are saponified with an alkali metal hydroxide.

26. The process of claim 12 wherein the content of said comonomers is from 5 to 15 weight percent relative to the weight of the composition.

* * * * *

UNITED STATES PATENT AND TRADEMARK OFFICE
CERTIFICATE OF CORRECTION

PATENT NO. : 4,795,762

DATED : January 3, 1989

INVENTOR(S) : Michael Diamantoglou et al.

It is certified that error appears in the above-identified patent and that said Letters Patent is hereby corrected as shown below:

Column 3, line 28, "preferaby" should read -- preferably --.

Claim 2, lines 3-4, delete "preferably 2 to 10 weight percent,".

Signed and Sealed this

Fifteenth Day of August, 1989

Attest:

DONALD J. QUIGG

Attesting Officer  Commissioner of Patents and Trademarks